United States Patent [19]

Iftikar et al.

[11] Patent Number: 4,471,396
[45] Date of Patent: Sep. 11, 1984

[54] DISC RECORDING APPARATUS INCLUDING INTEGRAL TRACK ZERO AND CRASH STOP MEANS

[75] Inventors: Syed H. Iftikar, Fremont; David L. Reeck, San Jose, both of Calif.

[73] Assignee: Seagate Technology, Scotts Valley, Calif.

[21] Appl. No.: 263,742

[22] Filed: May 14, 1981

[51] Int. Cl.³ .............................................. G11B 5/55
[52] U.S. Cl. .................................................. 360/106
[58] Field of Search ...................... 360/75, 77, 78, 70, 360/98, 97–99, 105, 106

[56] References Cited

U.S. PATENT DOCUMENTS

| | | | |
|---|---|---|---|
| 3,881,189 | 4/1975 | Mayeda | 360/106 |
| 4,143,409 | 3/1979 | Iwabuchi et al. | 360/106 |
| 4,161,004 | 7/1979 | Dalziel | 360/106 |
| 4,170,146 | 10/1979 | Owens | 74/89.2 |
| 4,200,894 | 4/1980 | Kaseta et al. | 360/106 |
| 4,237,501 | 12/1980 | Barmache et al. | 360/105 X |
| 4,237,502 | 12/1980 | Erickson, Jr. et al. | 360/77 X |
| 4,280,157 | 7/1981 | Herman et al. | 360/97 |
| 4,286,296 | 8/1981 | Cunningham | 360/77 |
| 4,330,806 | 5/1982 | Iwabuchi et al. | 360/97 |

Primary Examiner—Aristotelis M. Psitos
Assistant Examiner—K. C. Wong
Attorney, Agent, or Firm—Flehr, Hohbach, Test, Albritton & Herbert

[57] ABSTRACT

A head positioning assembly for disc drives including a zero track indicator and crash stops.

7 Claims, 4 Drawing Figures

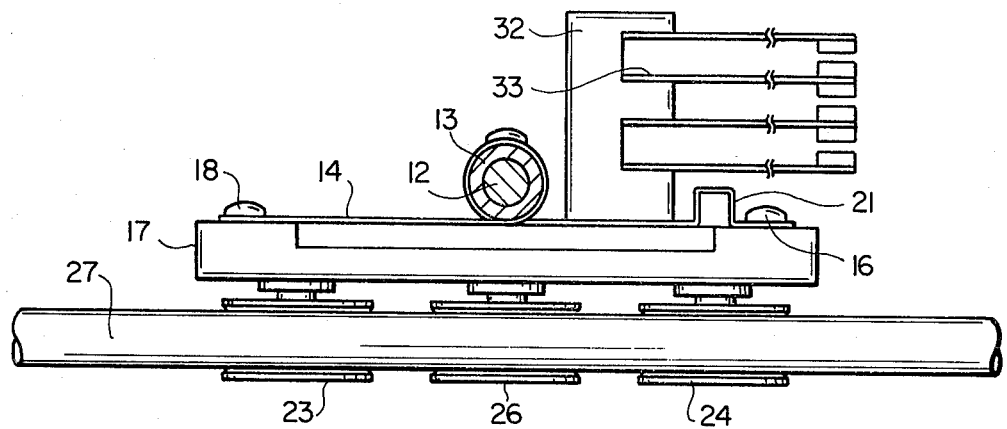
FIG_1
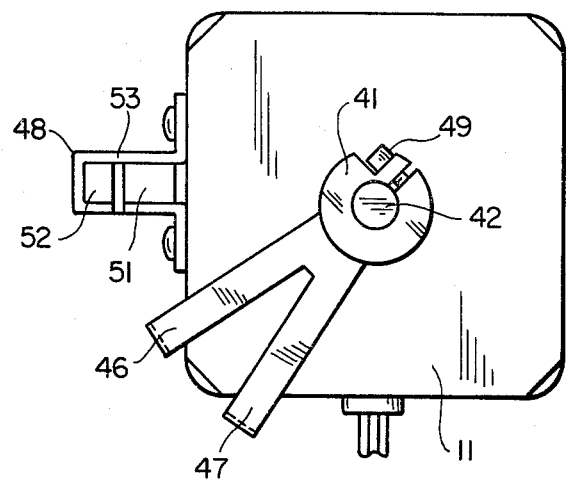
FIG_3
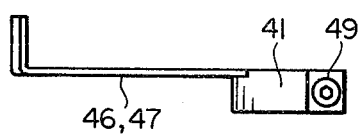
FIG_4

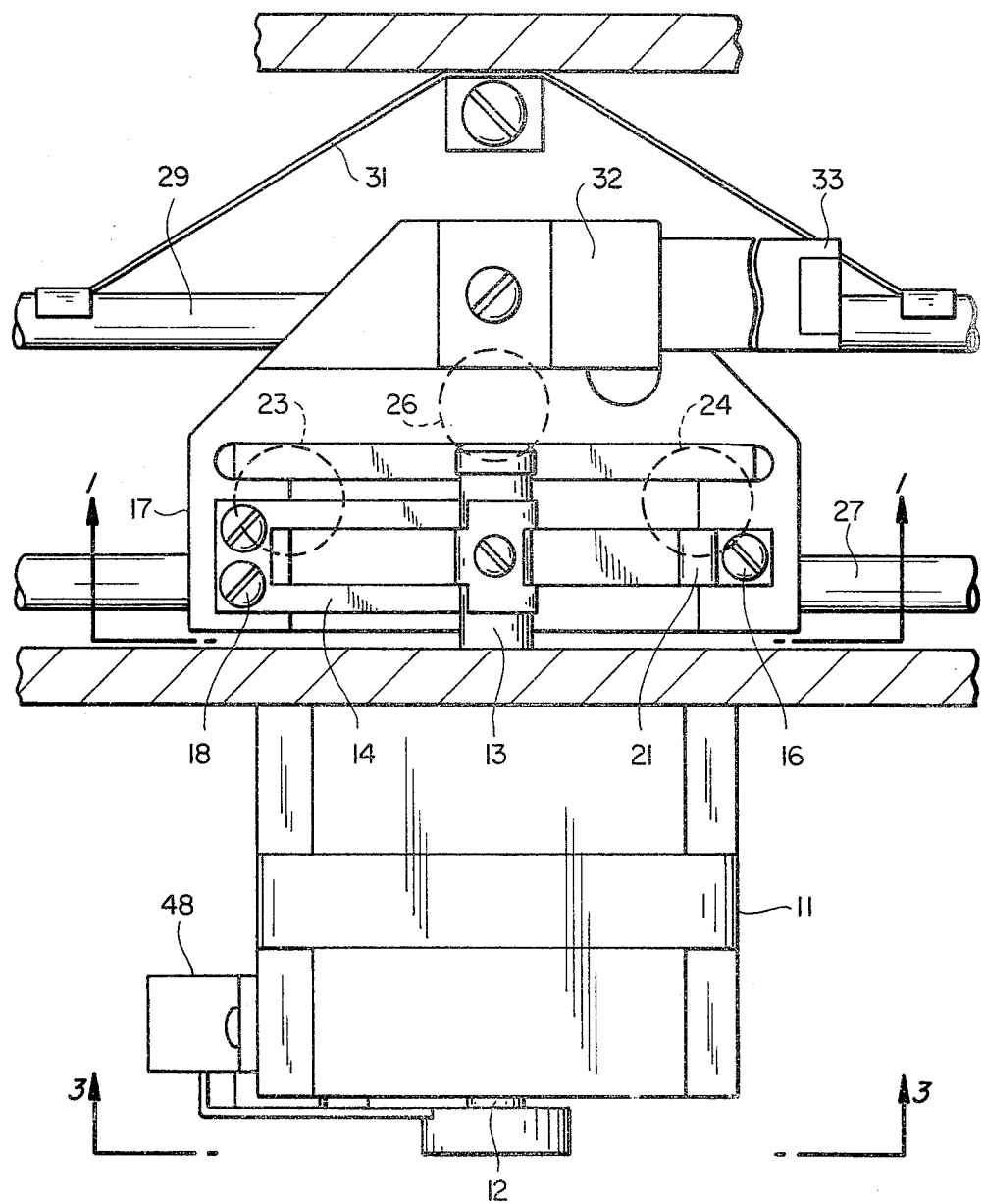
FIG_2

DISC RECORDING APPARATUS INCLUDING INTEGRAL TRACK ZERO AND CRASH STOP MEANS

This invention relates generally to disc recording apparatus and more particularly to such apparatus including means for identifying the initial track (zero track) and for limiting the travel of the heads across the disc to prevent mechanical crashes.

Disc drive apparatus utilize disc recording of information on concentric circular tracks. Tracks are written and read by magnetic heads which cooperate with the surface of the disc. Various methods have been used to position the heads including head screw drives and the band drives. Band drives are shown and described in U.S. Pat. Nos. 3,881,189, 4,161,004 and 4,170,146 among others. These drives convert rotary motion of a stepper motor to linear motion of the read-write heads which are mounted on a carriage and move radially across the recording disc to form adjacent circular tracks. A new concentric circular track is formed at each step of the stepper motor. The spacing of the tracks is dependent upon the amount of rotation that the motor shaft undergoes with each step and diameter of the pulley upon which the band is wound.

During writing and reading there is a need for identifying the tracks. Generally the tracks are counted and indexed from an initial position. In the art this has been the initial outertrack which is referred to as "track zero". Thus, the head positioning apparatus must provide a signal representative of this position.

Such apparatus usually includes so called crash stops. These stops provide a mechanical fixed stop which prevents movement of the carriage past its end point which might physically damage the equipment. This is necessary in the event that the electrical controls fail and attempt to drive the carriage past its safe limits.

In the prior art the track zero stop and the forward stop have been independently adjustable. The adjustment of the track zero and crash stops during manufacture of a disc drive has been tedious and time consuming.

It is an object of the present invention to provide a disc recording apparatus in which the zero position and crash stops are preset.

The foregoing and other objects of the invention are achieved by providing a drive motor for a linear drive which includes a drive shaft, a preset crash stop and zero track interrupt mounted on said drive shaft, and a switch means and fixed stop mounted on the housing of said motor adapted to be engaged by said preset crash stop and zero track interrupt whereby in one direction of rotation of said motor the interrupt activates the switch to indicate tracks zero and strikes a stop to limit travel in one direction and in its other direction of rotation said crash stop and zero track interrupt strikes the stop to limit travel in the other direction.

The foregoing and other objects will be more clearly understood from the following description taken in connection with the accompanying drawing, of which:

FIG. 1 is a sectional view taken along the line 1—1 of FIG. 2 showing a carriage drive mechanism in accordance with the invention.

FIG. 2 is a plan view of a carriage drive including drive motor.

FIG. 3 is an end view of the motor showing the moving crash stop and zero track interrupt and the fixed switch and stop.

FIG. 4 is a side elevational view of the crash stop and zero track interrupter.

FIGS. 1 and 2 show a head actuator assembly employing a moving crash stop and zero track interrupt in accordance with the invention. The actuator can be used in connection with a conventional disc drive preferably with a disc drive of the type shown and described in copending application, Ser. No. 139,428 filed Apr. 11, 1980 entitled HARD FIXED DISC DRIVE ASSEMBLY AND READ-WRITE HEAD ACTUATOR and assigned to the same assignee. The actuator is seen to comprise a stepper motor 11 having a drive shaft 12, a hollow pulley 13 is carried at one end of the drive shaft 12 and is adapted to receive a drive band 14. The band includes an inner portion secured by a screw 16 to one end of a carriage 17 and a pair of outer portions secured by screws 18 to the other end of the carriage. Preferably the drive band includes a U-shaped spring portion 21 to maintain predetermined tension upon the band. The center portion of the band where the center and outer portions merge is suitably secured to the pulley 13.

Rotation of the pulley clockwise or counterclockwise winds and unwinds band portions onto the shaft to move the carriage. The carriage includes spaced bearings 23, 24 and 26 disposed in a triangular configuration. Two of the bearings 23 and 24 are adapted to ride along a fixed way or track 27 while the other bearing 26 is adapted to ride along a floating track 29. The track 29 is supported by a spring 31 or other resilient means whereby to urge the track 29 against the bearing 26 to maintain the bearings 23 and 24 in intimate contact with the fixed trackway. This provides a self-aligning no backlash arrangement with minimum wear and increasing bearing life. The carriage guide is described in more detail in my copending application, Ser. No. 139,428, filed Apr. 11, 1980, assigned to the same assignee.

The carriage 17 is relatively light and serves to mount an E-shaped or other suitable mount 32 for a plurality of magnetic heads 33 which are adapted to cooperate with one or more discs associated therewith. By controlling the stepper motor 11 the carriage moves linearly along the track 27 to move the heads radially in and out along the surface of the associated disc to read and write information on the disc surface.

The other end of the shaft 12 carries the moving crash stop and zero track interrupter. The crash stop includes a split collar 41 adapted to be mounted upon the shaft end 42 of the stepper motor. The collar is secured to the shaft by means of a screw 49. The moving crash stop and zero track interrupter comprises a pair of outwardly extending arms 46 and 47 formed of sheet metal or the like and welded or otherwise secured to the collar 41. The outer ends of the arms are bent at 90° to form a stop and a stop and zero track interrupter. A fixed crash stop and zero track switch 48 is mounted on the motor housing and includes a photoelectric sensor comprising a light source such as a photodiode 51 spaced from a transducer 52. The light from the photodiode is interrupted by the track zero interrupter as the motor rotates clockwise as shown in the figure and strikes the stop 53. This establishes the zero position of the assembly and provides a zero signal to the associated electrical circuits. In its other direction of rotation, the other arm 47 of the moving crash stop strikes the the fixed housing 53 of the photoelectric sensor and physically stops rotation. It is seen that there is no requirement for any adjustments since the total rotational movement in the two directions of travel is predetermined by the spacing or angle of the crash stop arms 46 and 47. Thus the total rotation is preset and predetermined. This of course fixes or determines the travel of the carriage and heads.

There has been provided a simple inexpensive means providing zero track information and providing physical stops for each direction of rotation and a zero track signal.

What is claimed is:

1. A crash stop and zero track indicator assembly for a drive for magnetic heads of the type which includes a drive motor having a drive shaft and a linear drive for moving the heads comprising a stationary switch and stop assembly and a moving stop and zero track interrupter mounted on said shaft for rotation therewith, said moving stop and zero track interrupter including a pair of fixed spaced stops adapted to strike said stationary switch and stop assembly in both directions of rotation to limit rotation of said shaft and to activate said switch to indicate zero track in one direction of rotation.

2. A crash stop and zero track indicator for disc apparatus including magnetic heads which are moved by a motor to read and write recording tracks on a disc comprising a zero track sensor and crash stop mounted on said motor, a moving crash stop and zero track interrupter mounted on the shaft of said motor, said crash stop and zero track interrupter serving to activate said sensor and stop rotation in a first direction of rotation of said shaft and to stop rotation of said shaft in the other direction of rotation to limit the movement of said magnetic heads.

3. A crash stop and zero track indicator as in claim 2 wherein said moving crash stop and zero track interrupter comprises a collar adapted to be mounted on the motor shaft and spaced radially outwardly extending arms mounted on said collar and having their outer ends adapted to engage said zero track sensor and crash step.

4. In a disc drive having a carriage for positioning at least one magnetic head relative to a disc having radially spaced data tracks thereon, a motor, a drive shaft coupled to said motor and said carriage for radially positioning said carriage carrying said magnetic head relative to said disc, a stationary sensor and stop assembly mounted in a fixed position relative to said movable carriage, and a moving crash stop and zero track interrupter mounted for rotation with said drive shaft, said crash stop and zero track interrupter including fixed stop means for striking said stationary sensor and stop assembly in both directions of rotation, said crash stop and zero track interrupter serving to activate said sensor and stop rotation in a first direction of rotation of said shaft corresponding to a first direction of movement of said carriage, and striking said stop and sensor assembly in a second direction of rotation to establish a limited movement in a second direction of rotation corresponding to said second direction of movement of said magnetic heads.

5. A system as claimed in claim 4 wherein said stop determining means comprises a pair of fixed stops circumferentially spaced relative to said drive shaft, the position of said first stop relative to said assembly establishing a track zero stop, the positioning of said second step relative to said assembly establishing a forward stop for travel of said head relative to said disc.

6. A system as claimed in claim 5 wherein said fixed assembly comprises a sensor responsive to said first fixed stop for establishing a zero track position for said magnetic heads traveling relative to said disc.

7. A disc drive system as claimed in claim 5 wherein said stop is located on said motor drive assembly, said moving crash stop and zero track interrupter being mounted on the shaft of said motor at the opposite end of said shaft from said carriage drive means driven by said motor drive shaft.

* * * * *